United States Patent [19]
Young et al.

[11] Patent Number: 4,754,445
[45] Date of Patent: Jun. 28, 1988

[54] OPTICAL DISC AUTO-CHANGER

[75] Inventors: Niels O. Young, Eagle, Id.; William J. Sell, San Francisco, Calif.

[73] Assignee: Litton Industrial Automation Systems, Inc., Florence, Ky.

[21] Appl. No.: 85,254

[22] Filed: Aug. 11, 1987

Related U.S. Application Data

[63] Continuation of Ser. No. 792,368, Oct. 28, 1985, abandoned.

[51] Int. Cl.$^4$ .............. G11B 17/24; B65G 57/04; B65H 5/08
[52] U.S. Cl. .............. 369/37; 198/346.2; 198/468.4; 369/192; 414/223
[58] Field of Search .............. 369/36, 37, 38, 39, 369/191, 197, 202; 414/223; 198/468.4, 346.2

[56] References Cited

U.S. PATENT DOCUMENTS

| | | | |
|---|---|---|---|
| 1,906,620 | 5/1933 | Knight et al. | 369/202 |
| 1,996,412 | 4/1935 | Fern | 369/191 |
| 2,013,927 | 9/1935 | Pitman | 369/195 |
| 2,047,160 | 7/1936 | Zeruneith | 369/203 |
| 2,139,812 | 12/1938 | Erbe | 369/38 |
| 2,565,881 | 8/1951 | Peters | 369/36 |
| 2,572,609 | 10/1951 | Gierwiatowski | 74/479 |
| 2,666,649 | 1/1954 | Vandersee et al. | 369/38 |
| 2,670,211 | 2/1954 | Freimann et al. | 369/38 |
| 2,725,235 | 11/1955 | Hull et al. | 369/39 |
| 3,030,116 | 4/1962 | Rockola | 369/160 |
| 3,247,737 | 4/1966 | Rockola | 369/37 |
| 3,264,003 | 8/1966 | Thevenaz | 369/191 |
| 3,455,560 | 7/1969 | Tuttle | 369/190 |
| 3,860,125 | 1/1975 | Johnson et al. | 198/468.4 |
| 4,264,254 | 4/1981 | Chang | 369/202 |
| 4,501,527 | 2/1985 | Jacoby | 414/225 |
| 4,564,101 | 1/1986 | Nagel | 198/346.2 |

Primary Examiner—Steven L. Stephan
Attorney, Agent, or Firm—Townsend and Townsend

[57] ABSTRACT

An auto-changer for optical discs. At least one carousel rotatable about a horizontal axis stores a large number of discs. A picker moves into the carousel to grasp a disc in a horizontal position in the carousel and then move the disc to a position outside of the carousel. A transfer arm grabs the disc from the picker and swings the disc in an arcuate path over to a disc player, where it is deposited for playing.

19 Claims, 3 Drawing Sheets

U.S. Patent  Jun. 28, 1988  Sheet 1 of 3  4,754,445
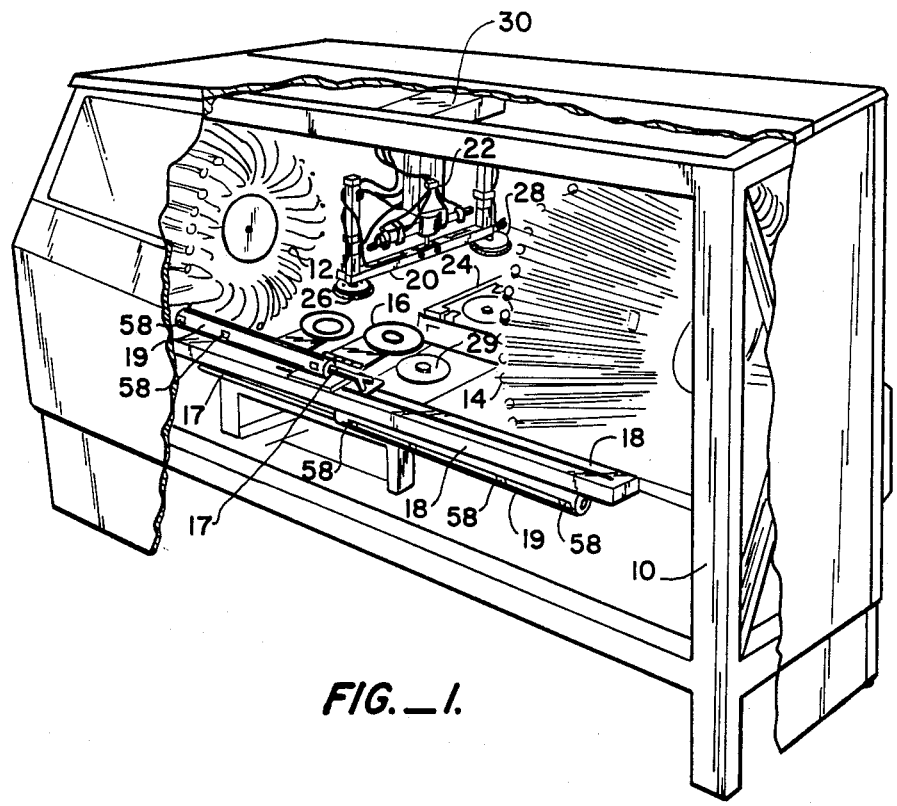
FIG._1.
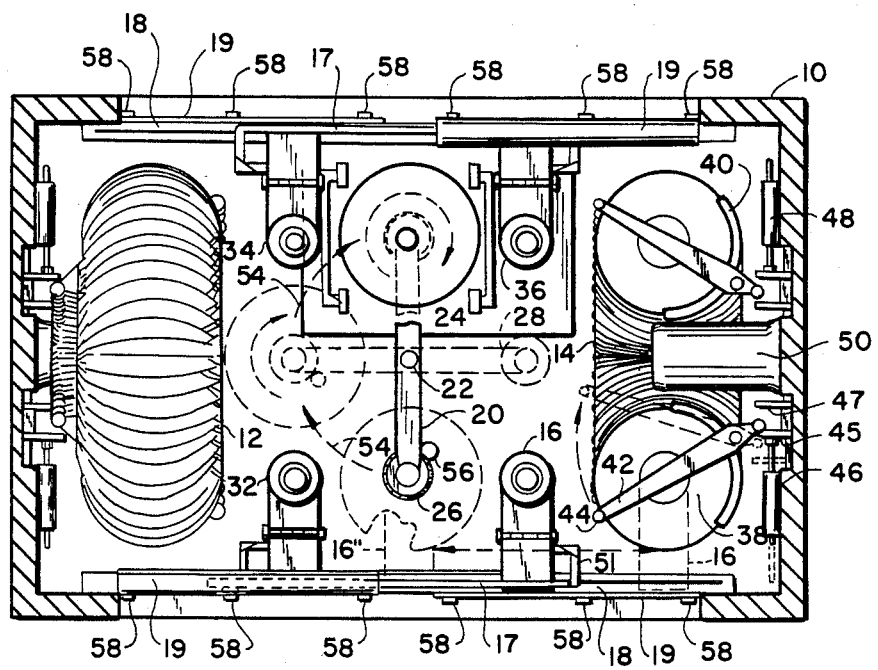
FIG._2.

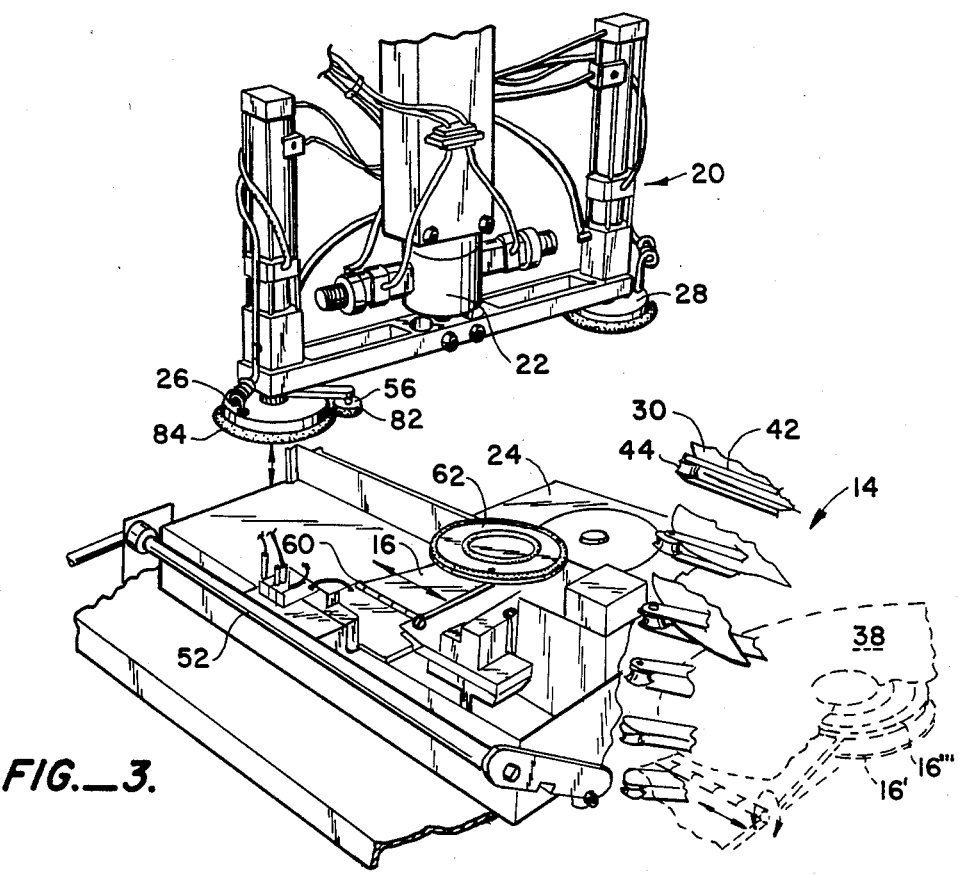
FIG._3.
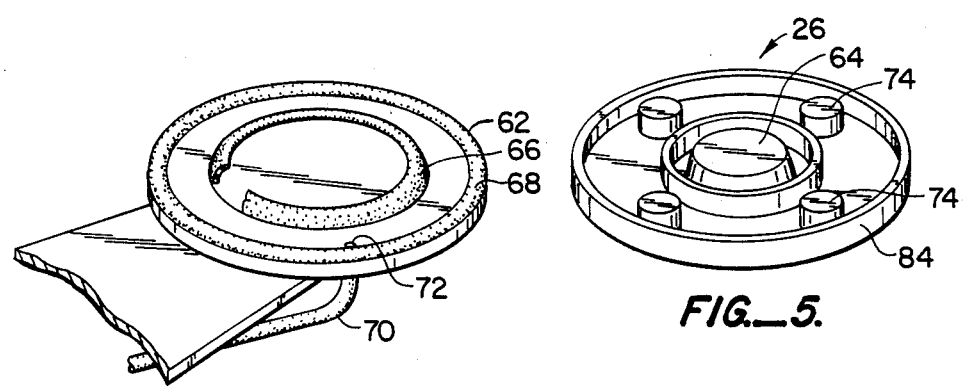
FIG._4.
FIG._5.

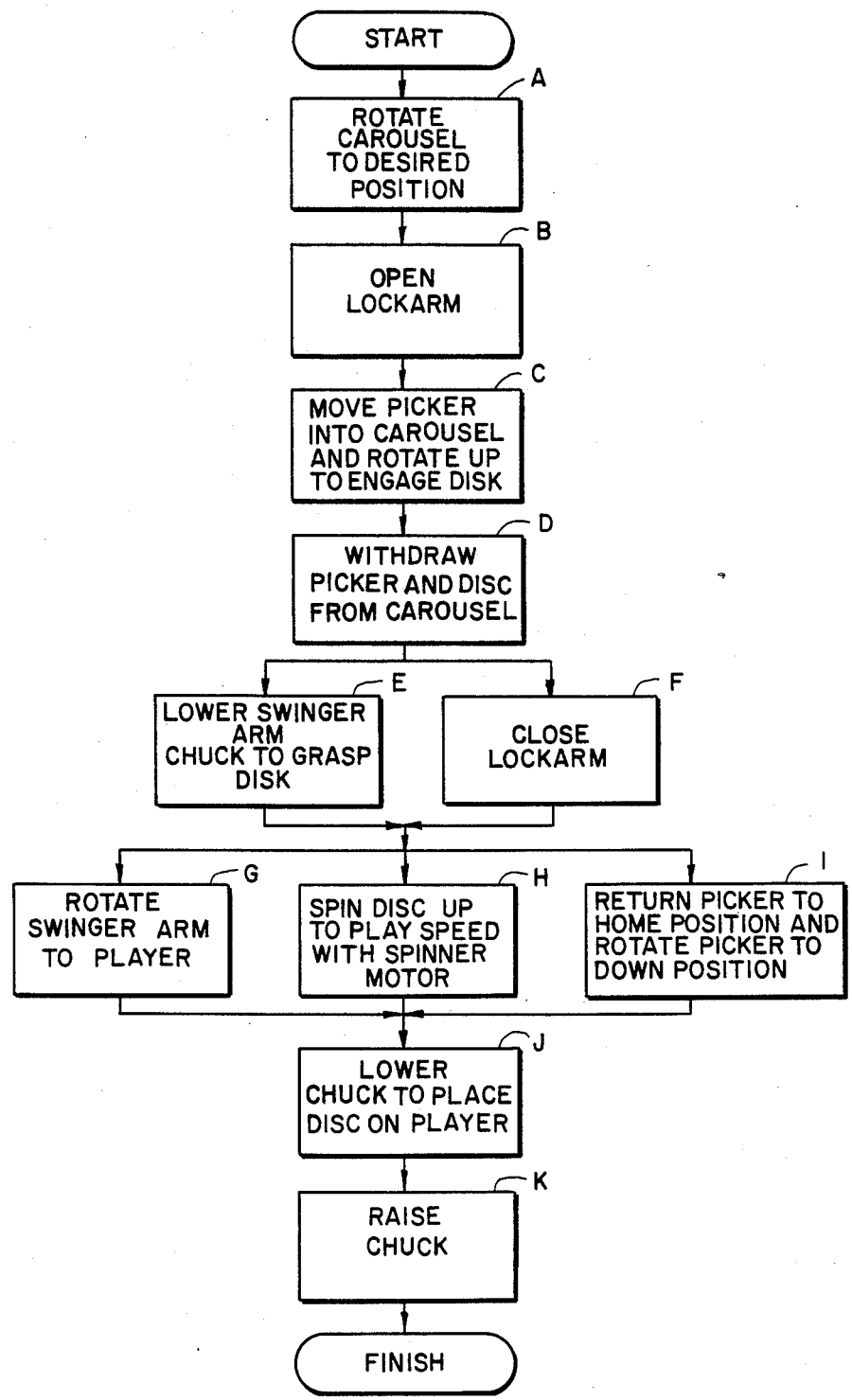
FIG._6.

OPTICAL DISC AUTO-CHANGER

This is a continuation of application Ser. No. 792,368, filed Oct. 28, 1985, now abandoned.

BACKGROUND OF THE INVENTION

This invention relates to an optical disc auto-changer for playing a large number of optical discs.

An optical disc is a data storage device on which digital data is written and read optically using a laser. An optical disc is shaped like a phonograph record and is typically made of plastic, metal or glass. Data is written onto the disc coded in binary form by a laser which burns a sequence of tiny craters in the disc along a series of concentric tracks similar to the spiral groove of a phonograph record. The presence or absence of a crater along a track represents a binary one or zero, respectively. Data is read from the disc by directing a laser beam at a track as the disc spins and detecting the presence or absence of such craters by analyzing the reflected beam. The laser-generated craters representing the binary data can be packed so closely together that over a billion bits can be stored on one side of a 12-inch diameter disc. The optical disc has the advantage of storing a large amount of information and maintaining the integrity of that information for a long period of time without the danger of erasure, which exists for magnetic tapes and discs. Magnetic fields or other effects which cause the decay of induced magnetization on a magnetic tape or magnetic disc can obscure the recorded data and cause unintentional erasures. These problems do not affect optical discs. Optical discs are thus ideally suited for permanent files and archival records.

Notwithstanding the large amount of data that can be stored on a single disc, large archival systems still require many discs. Optical disc players are known for holding and playing a single disc. These players require that the disc be inserted manually. Manual operation is undesirable for a large archival system in which a desired disc must be selected quickly from a large bank of discs.

A familiar device for placing one of a large bank of disc-shaped objects on a player is the jukebox for phonograph records. The designs of jukeboxes can be looked to for general guidance on how to construct an auto-changer for optical discs. One such jukebox device is shown in U.S. Pat. No. 3,455,560 to Tuttle. Tuttle discloses a large number of records stored on a circular carousel and a movable arm for grasping one of such records around its edge. The arm then rotates 180° while twisting 90° to place the record on a turntable. The carousel can be rotated so that different records may be accessed.

Another design is shown in U.S. Pat. No. 3,008,721 to Corbett, Jr., et al. Corbett also shows a circular carousel but the turntable is located at the center of the carousel in a vertical position. Records are rolled upward from the carousel onto the turntable where they are played in a vertical position. The record may be rolled from either side of the carousel to play either side of the record. Thus, to turn the record over, it is replaced on the carousel, the carousel is rotated 180°, and the record is again rolled onto the turntable.

The Tuttle and Corbett designs are representative of the problems encountered in extending known jukebox designs to optical disc auto-changers. The rotating and twisting arm of Tuttle must make movements in multiple directions, thereby requiring increased complexity and alignment problems. Complicated mechanisms which increase maintenance requirements are undesirable for optical disc auto-changers where reliability and speed of access are especially important. Proper alignment of an optical disc being placed on a disc player is critical due to the high density of data on an optical disc and the corresponding precision required for reading an optical disc.

The Corbett design requires that the player be mounted vertically, which would add to the complexity and alignment problems for an optical disc player. In addition, optical discs are often used for archival storage of data which is difficult if not impossible to replace if lost, unlike jukebox records, which can normally be readily replaced. Optical discs are often made from glass, and although the data cannot be magnetically erased, optical discs are sensitive to dirt, scratches and smears. Therefore, optical-disc autochangers must be clean and reliable in their operations to avoid damaging the discs. These considerations have impeded attempts to adapt jukebox designs to optical disc auto-changers.

SUMMARY OF THE INVENTION

The present invention provides an auto-changer for optical discs which is fast, precise and reliable. A number of optical discs are stored in a container in the auto-changer. A picker moves relative to the container to engage and hold a disc in the container and remove the disc from the container. The disc is then engaged and held by a transfer mechanism which moves the disc from the picker to a disc player.

Preferably, the container is a carousel which rotates about a horizontal axis. Two carousels are placed on either side of the disc player. Four pickers are used, two for each carousel. The second picker on each carousel accesses a disc which is 180° relative to the carousel's axis of rotation from a disc accessed by the first picker. The pickers move linearly in a horizontal plane to within a carousel and then swing upward to engage the disc which is in the horizontal position in the carousel. The disc is engaged at its center. A suction is applied in an area between two rubber seals to hold the disc.

A lockarm holds each disc in the carousel with a pair of members extending across both sides of the disc joined at a roller which engages the edge of the disc. The lockarm is bistable and is moved to one side to release the disc when the disc is grasped by a picker. A picker withdraws the grasped disc horizontally to a position outside of the carousel where a swinger arm having a boss at its center and magnets engages the disc from the top. The swinger arm is the transfer mechanism for moving the disc from the picker to the player. The picker then releases the disc and the swinger arm rotates the disc to above the disc player and places the disc on the player. The swinger arm will rotate in an arc to a position above the player from pickers on either side of the auto-changer.

A motor on the swinger arm starts the disc rotating while it is being moved to a position above the player, so that the disc is already spinning when it is placed on a moving player, thereby improving the access time because the player can already be up to playing speed. Opposite sides of a disc are accessed by rotating the carousel 180° and removing the disc from its new position in the carousel with the other picker.

The operation of an auto-changer according to the present invention is preferably implemented with a computer which automatically keeps track of the locations of the individual discs and controls the timing and initiation of the various operations of the autochanger. Sensors provide signals to the computer to indicate the position of the carousel, pickers, and swinger arms as well as whether a disc is engaged by any of these. The computer is preferably programmed to allow concurrent operations where possible. For instance, the carousel can be rotated to the next desired disc while the picker and swinger arm are moving a disc to or from the player.

A centering boss is used to engage the center hole of the disc, providing for improved precision over mechanisms used for phonograph jukeboxes. Pneumatic controls are used to operate most aspects of the auto-changer, providing a clean mechanism for handling optical discs with a minimum amount of grease or other dirt which could produce errors on a disc. The two-step operation of using a linear picker and a swinger arm simplifies the movements and mechanisms of the auto-changer, thereby enhancing reliability and performance precision.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a perspective view of a preferred embodiment of the present invention;

FIG. 2 is a top plan section, partially broken away, of the embodiment of FIG. 1;

FIG. 3 is an expanded prospective view of the picker and swinger arm of FIG. 1;

FIG. 4 is an enlarged prospective view of the picker of FIG. 1;

FIG. 5 is an enlarged prospective view of the swinger arm chuck of FIG. 1; and

FIG. 6 is a flowchart of steps for retrieving a disc by the apparatus of FIG. 1.

DETAILED DESCRIPTION OF THE PREFERRED EMBODIMENT

FIG. 1 shows a preferred embodiment of the auto-changer of the present invention. A frame 10 houses a pair of carousels 12 and 14. A picker 16 moves along a track 18. A swinger 20 rotates about a center member 22 to pick up discs from picker 16 and place them on player 24. Swinger arm 20 has a pair of chucks 26, 28, for grasping discs. A microcomputer 30 controls the operation of the auto-changer. A queuing station 29 allows temporary storage of a disc. An advantage of carousel storage is that only rotary motion, rather than linear motion, is required for access. This results in a volume savings since the carousel requires no greater space for movement than it does when stationary.

FIG. 2 shows a cutaway view of the auto-changer of FIG. 1 from the top. In addition to picker 16, three additional pickers 32, 34, and 36 are shown. These four pickers allow discs to be accessed on either side of both carousels 12, 14. Each of carousels 12, 14 holds fifty discs. In carousel 14, a typical disc 38 is held in a slot created by a grooved arced member 40 by a lockarm 42. Lockarm 42 extends on both sides of disc 38 and engages the edge of disc 38 with roller 44. An air cylinder 46 is operative to engage lockarm 42 and move it to the position shown in phantom. While air cylinder 46 is retracted, carousel 14 is prevented from moving because the ends of adjacent lockarms 42 would hit knob 47 of air cylinder 46 in its retracted position. With lockarm 42 in the open position, picker 16 can move in and grasp disc 38 and remove it from carousel 14. Upon release of air cylinder 46, lockarm 42 is spring-biased back to its original position.

Lockarm 42 is spring-biased in both directions to be bistable. Thus, lockarm 42 need only be pushed partly towards either position to enable the springs to snap it into position. Thus, knobs 45, 47 of air cylinder 46 need not contact lockarm 42 at either position, allowing for knobs 45, 47 to be spaced from lockarm 42 when air cylinder 46 is not activated. This spacing allows carousel 14 to freely rotate. Another air cylinder 48 is used for the other side of carousel 14. Carousel 14 is rotated by a motor 50. It is advantageous to gear motor 50 such that it rotates once in advancing carousel 14 from one disc to the next. This enables precise control of the position of carousel 14. A harmonic gear can be used with backlash and angular error as small as 0.005 of a turn of motor 50.

In operation, picker 16 is moved along track 18 by a rod 17 which extends from an air cylinder 19. When a disc 38 to be accessed is in the horizontal position, picker 16 moves to a position 16' shown in phantom. Air cylinder 46 causes lockarm 42 to move into the open position, whereupon picker 16 can grasp disc 38. Picker 16 then moves with disc 38 to a second position 16'', where disc 38 can be grasped by chuck 26. When chuck 26 has grasped disc 38, picker 16 releases disc 38 and returns to its original home position, as shown in solid. Swinger 20 then rotates about axis 22 as shown by the arrows 54 until disc 38 is above player 24. While swinger 20 is so rotating, a spin motor 56 causes chuck 26 to spin, thereby rotating disc 38 up to a playing speed. When disc 38 is above player 24, it can then be deposited upon player 24 while player 24 is at full play speed. Playing speeds on typical optical disc players are greater than 1000 rpm. A typical playing speed is 1128 rpm for the Thomson-CSF GD1001.

Disc 38 may not be precisely aligned in carousel 14 due to variations in the width of the disc or play in the pocket formed by lockarm 42 and slot 40. Picker 16 has an inclined portion 51 which serves to engage the edge of disc 38 as picker 16 moves into carousel 14 and to lift disc 38 into its aligned position.

For removing a disc, the steps outlined above are reversed, with motor 56 starting chuck 26 spinning before picking up a disc from player 24. Motor 56 is then decelerated to stop the spinning of the disc before the disc is placed on a picker.

FIGS. 3 and 4 show a picker 16 in more detail. As can be seen from FIG. 3, picker 16 moves to a position 16' in carousel 14. When in this position, picker 16 can be rotated about a hinge 60 to move into position 16'''. In this position, a nose piece 62 of picker 16 engages an optical disc 38. Rubber seals 66 and 68 engage a center portion of disc 38. A vacuum hose 70 attached to nosepiece 62 and communicating through a hole 72 is used to create a vacuum between seals 66 and 68. The successful attachment of a disc is monitored by a vacuum sensor (not shown) coupled to hose 70.

A portion of chuck 26 as seen from below is shown in FIG. 5. A centering boss 64 engages the central hole in the disc. A similar centering boss is not present on picker 16 to avoid interference between two bosses on the transfer of a disc. Alternately, a resilient boss could be used for picker 16. Four magnets 74 serve to hold a disc. The center portion of a disc is metal, even if the remainder of the disc is plastic or glass. Alternately, the structures of picker 16 and chuck 26 could be reversed. However, the precise centering provided by boss 64 is critical for placement of the disc on player 24. If boss 64 is alternately placed on picker 16, care must be taken to maintain the centered alignment during the transfer from picker 16 to chuck 26 and during the spinning of the disc with spin motor 56.

Spin motor 56 of FIG. 3 enables a disc 38 to be pre-spun before being placed on player 24 and to be de-spun after being removed from player 24. A rubber drive wheel 82 engages a rubber wheel 84 on the edge of vacuum chuck 26 to produce the necessary drive to spin chuck 26.

Queuing station 29 can be used to temporarily store the next disc to be placed on player 24, thereby improving the access time. Alternately, a second player could be used in the position of queuing station 29. If two players are used, a disc can be temporarily stored on one of chucks 26, 28, while the other chuck is used to move discs.

The operation of the auto-changer is controlled by microcomputer 30 of FIG. 1 with position information being provided by sensors at all rest positions of the auto-changer (i.e., a picker in a carousel, a lockarm open or closed, etc.). During the transition from one position to another, the sensor for the goal position provides a logic zero signal to microcomputer 30. When the goal position is reached, the sensor will provide a logic one to microcomputer 30. Upon detecting such a logic one, microcomputer 30 instructs the auto-changer to proceed to the next step.

Sensors 58 provide information regarding the position of pickers 16, 32, 34, and 36. A Hall effect sensor is used to detect the presence of a magnet imbedded in rod 52 to show the location of picker 16 at its home position, position 16', or position 16''. A microswitch is used to detect whether picker 16 is in the up or down position. Other types of sensors may be used as well with due regard for ease of implementing, maintenance, cost and failure mode management.

The open position of a lockarm 42 is sensed by means of the back pressure felt at air cylinder 46. The closed position of lockarm 42 is sensed by a Hall-effect sensor which is activated by a magnet in air cylinder 46. Pressure sensing of the vacuum in nosepiece 62 indicates whether a disc is successfully attached to picker 16. Each of chucks 26, 28 has two vertical positions, set by end stops (not shown). Hall-effect sensors are used to determine whether the chucks are in their end positions.

The position of chucks 26, 28 relative to player 24 is determined from a Hall-effect sensor on swinger arm 22. The presence of a disc on chucks 26, 28 is determined by a pressure sensor. Because discs are magnetically held to chucks 26, 28, air can be injected into the space between a disc and the edges of chuck 26 and the increase in air pressure will indicate the presence of a disc.

An infrared sensor is used to detect the presence of a disc in a horizontal position in carousel 14 and a sensor on the servo board (not shown) of computer 30 is used to detect whether carousel 14 is in the correct position. Additional sensors detect the various operations of player 24, the overall air pressure of the pneumatic system, electrical power status, etc. The use of sensors allows computer 30 to be programmed to detect errors in the operation of the auto-changer and to correct or circumvent those errors or flag them for operator intervention.

When the auto-changer is moving discs about, player 24 is isolated mechanically from the tremors by an arrangement of springs and dampers. Additionally, player 24 may be forceably cinched to frame 10 during the time that discs are transferred to and from the turntable to insure proper alignment.

The use of multiple pickers and carousels makes it possible to do concurrent operations and otherwise vary the sequence of operations. This makes the auto-changer particularly well suited to computer control. The programming of such a computer does not form a part of this invention and thus is not disclosed herein.

FIG. 6 is a flow chart showing the operations necessary to acquire a disc from a carousel and deposit it upon player 24. The flow chart also gives examples of how concurrent operations can occur in the auto-changer. The carousel is first rotated to the desired position so that the disc to be played is in the horizontal position where it can be picked up by an appropriate picker (Step A). The lockarm on the disc is then opened (Step B). The picker moves along the track into the carousel and rotates upward to engage the disc (Step C). The picker will then withdraw from the carousel (Step D). The swinger arm chuck will then lower to grasp the disc (Step E), while, concurrently, a lockarm in the carousel is closing (Step F). The swinger arm then rotates the disc over to the player (Step G). While the swinger arm is rotating, the spinner motor is causing the disc to spin up to the play speed (Step H). In addition, the picker is also returning to its home position and rotating down at this time (Step I). Chuck 26, when in position over player 24, is lowered to place the disc on the player (Step J). After the disc is deposited, chuck 26 is raised, and the sequence is finished (Step K).

The sequence for returning a disc to its carousel is identical in reverse order, except that the spinner motor would decelerate, rather than accelerate, the disc. It can be seen that concurrent operations for returning and retrieving discs are possible because one picker can be returning a disc to one carousel while another picker can be retrieving a disc from the other carousel. A disc can also be placed on queuing station 29 to improve access time. Two players can also be used, further enhancing the speed of the system.

For storing the discs, each disc can be assigned a permanent slot or the microcomputer can keep track of the current position of a particular disc. Upon the initial loading of a carousel, or when only a few discs are in the carousel, the discs are preferably placed such that unbalanced torque on the carousel motor due to gravity acting on an uneven distribution of discs in the carousel is minimized. The computer program in the microcomputer controls the placement of the discs in the carousel so that the maximum unbalance at any one time does not exceed that which would be due to a single disc.

As will be understood by those familiar with the art, the present invention may be embodied in other specific forms without departing from the spirit or essential characteristic thereof. For example, a picker could grasp a disc around its edges rather than at its center. Also, the invention could operate on other types of discs, such as hard magnetic discs, floppy disks or even phonograph records. Accordingly, the disclosure of the preferred embodiment of the present invention is intended to be illustrative, but not limiting, of the scope of the invention which is set forth in the following claims.

What is claimed is:

1. Optical disc storage and retrieval apparatus for rapidly retrieving a selected disc to be played on an optical disc player, said apparatus comprising:
   storage means for holding a plurality of optical discs;
   picker means for removing a selected optical disc from said storage means, said picker means being structured and arranged to engage and hold said selected disc centrally on a first side thereof;
   said storage means and said picker means being structured for relative movement wherein said picker means is brought adjacent to said selected disc in position to centrally engage and hold said disc, said picker means being movable to extract a disc from said storage means;
   transfer means for transferring said gripped disc from said picker means to the optical disc player, said transfer means being structured and arranged to engage and hold said disc centrally on the opposite side from said picker means, said transfer means being movable to bring a disc held thereby into a load position at said disc player.

2. The apparatus of claim 1 wherein said storage means is rotatable about a central axis and said discs are angularly spaced apart about said central axis, whereby said storage means is rotatable to bring a selected optical disc to a first transfer position, said picker means being movable between said first transfer position and a second transfer position external to said storage means.

3. The apparatus of 2 wherein said central axis is horizontally said picker means moves horizontally between said first and second transfer positions.

4. The apparatus of claim 3 wherein said transfer means is pivotally mounted for rotation in a horizontal plane between said second transfer position and said load position.

5. The apparatus of claim 4 further comprising a second picker means disposed to access a disc in said storage means in a position 180° relative to said central axis from a position accessed by said first mentioned picker means.

6. An apparatus for placing discs onto a disc player and for removing said discs from said player comprising:
   at least one carousel for storing a plurality of discs, said carousel being mounted for rotation about a horizontal axis;
   first picker means for gripping a disc in said carousel and moving said disc to a position outside said carousel, said first picker means being adapted to move linearly along a line parallel to said horizontal axis of carousel;
   a second picker means for gripping a disc from a position in said carousel disposed 180° relative to said horizontal axis from a position accessed by said first picker means;
   a second carousel located on an opposite side of said disc player from said first carousel;
   third and fourth picker means for gripping discs from positions in said second carousel disposed 180° from each other relative to said horizontal axis; and
   transfer means for gripping said disc and moving said disc from one of said picker means to said disc player.

7. The apparatus of claim 6 wherein said transfer means comprises:
   a horizontal swinger arm rotatable about an axis perpendicular to said carousel axis;
   a perpendicular member attached to said swinger arm remote from said axis of said swinger arm and perpendicular to said swinger arm; and
   gripping means, attached to a lower end of said perpendicular member, for gripping a disc.

8. The apparatus of claim 7 further comprising spinner means, coupled to said gripping means, for causing said disc to accelerate to a specified spin speed while said disc is moving from a position above one of said pickers to a position above said disc player.

9. The apparatus of claim 8 wherein said spinner means is further adapted to cause a disc to decelerate while said disc is moving from said position above said player to said position above one of said pickers.

10. The apparatus of claim 7 wherein said gripping means is adapted to grip a center portion of said disc.

11. The apparatus of claim 10 wherein said gripping means includes means for applying suction to hold a disc.

12. The apparatus of claim 10 wherein said gripping means includes at least one magnet for gripping a disc.

13. The apparatus of claim 7 further comprising means for moving said gripping means up and down along said perpendicular member from a lower position to an upper position, so that said gripping means can engage said disc in said lower position and raise said disc to said upper position for movement between a position above one of said pickers and a position above said disc player.

14. An apparatus for placing discs onto a disc player and for removing said discs from said player comprising:
   at least one carousel for storing a plurality of discs, said carousel being mounted for rotation about a horizontal axis, said carousel including
   a plurality of retaining members each defining an arcuate slot for engaging an edge of a disc and,
   a plurality of lockarm members, each attached to a retaining member and extending from said retaining member across a first side of a disc, across an edge of said disc and across a second side of said disc, said lockarm member being movable from a first stable position to hold said disc against said retaining member to a second stable position allowing said disc to be removed;
   picker means for gripping a disc in said carousel and moving said disc to a position outside said carousel; and
   transfer means for gripping said disc and moving said disc from said picker means to said disc player.

15. The apparatus of claim 14 further comprising actuating means for moving one of said lockarm members in a horizontal position to said second stable position and restraining said carousel from rotational movement while in said position.

16. The apparatus of claim 15 wherein said actuating means comprises an air cylinder.

17. An apparatus for placing optical discs onto an optical disc player coupled to a frame and for removing said disc from said disc player, comprising:
   first and second carousels, coupled to said frame on opposite sides of said disc player, for storing a plurality of discs, said carousels having a common horizontal axis of rotation;

a pair of linear tracks, parallel to said horizontal axis and coupled to said frame exterior of said carousels on opposite sides of said frame;

four picker means, two of said picker means being coupled to each one of said tracks, for moving a disc from one of said carousels to a position outside said carousel;

four nosepiece means, each coupled to one of said picker means, for engaging a center portion of one of said discs; and transfer means, rotatable about a vertical axis coupled to said frame, for gripping said disc when said disc is on one of said picker means outside one of said carousels and moving said disc from said picker means to said disc player.

18. A method for placing discs onto a disc player and for removing said discs from said disc player comprising the steps of:

storing a plurality of discs in a carousel having a horizontal axis of rotation;

gripping a disc in a horizontal position on a first side of said carousel with a picker and moving said disc to a position outside of said carousel;

gripping said disc from said picker with a transfer arm;

moving said disc and transfer arm to a position over said disc player;

spinning said disc on said transfer arm up to a predetermined spin speed before placing said disc on said disc player; and placing said disc on said disc player.

19. A method for placing discs onto a disc player and for removing said discs from said disc player comprising the steps of:

storing a plurality of discs in a carousel having a horizontal axis of rotation;

gripping a disc in a horizontal position on a first side of said carousel with a picker and moving said disc to a position outside of said carousel;

gripping said disc from said picker with a transfer arm;

moving said disc and transfer arm to a position over said disc player;

placing said disc on said disc player; and removing said disc from said disc player with said transfer arm, said transfer arm having a vacuum gripping mechanism spinning at substantially the same speed as said disc, and decelerating said disc until it is no longer spinning.

* * * * *